Figure 1:
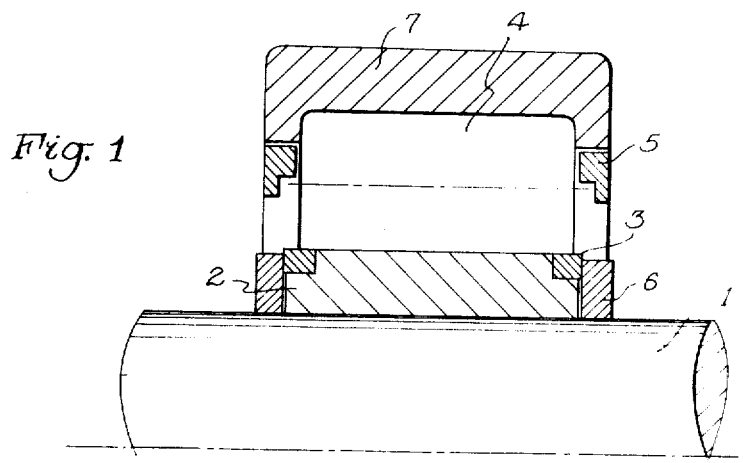

United States Patent

Laussermair et al.

[15] 3,680,934

[45] Aug. 1, 1972

[54] HIGH SPEED ROLLER BEARING

[72] Inventors: Friedrich Laussermair, Munich Albrecht Ziemer, Constance, both of Germany

[73] Assignee: Maschinenfabrik Ausburg-Nurnberg A.G., Munich, Germany

[22] Filed: Sept. 18, 1970

[21] Appl. No.: 73,356

[30] Foreign Application Priority Data

Sept. 20, 1969 Germany..............P 19 47 726.0

[52] U.S. Cl.................................................308/212
[51] Int. Cl..............................................F16c 19/22
[58] Field of Search.............................388/199, 200

[56] References Cited

UNITED STATES PATENTS 2,724,624 11/1955 Barr...........................308/200

*Primary Examiner*—Martin P. Schwadron
*Assistant Examiner*—Frank Susko
*Attorney*—Francis D. Stephens and Hugo Huettig, Jr.

[57] ABSTRACT

In a high speed roller bearing slippage is lessened by distributing large diameter rollers between smaller rollers so that at high speed, the smaller rollers ride the outer race and the large rollers ride both the inner and outer races.

3 Claims, 2 Drawing Figures

INVENTORS
Friedrich Laussermair
Albrecht Ziemer

HIGH SPEED ROLLER BEARING

This invention relates to a roller bearing for a high-speed shaft for avoiding slippage between the rollers and the bearing races.

Roller bearings are prone to have a kinematic operating condition at low speeds in which the cylindrical roller rolls without gliding on the inner and outer races. At high speeds, the roller bearings are known to run with a low load so that the cylindrical rollers are lifted off the inner race as the shaft speed increases and, because of centrifugal forces, are then braced against the outer race. Since, as a rule, the inner race is the driven element, the driving moment imparted to the rollers by friction becomes so small that it can no longer overcome the brake effect due to the mass and friction forces on the outer race. The rotation of the bearing cage, therefore, lags behind when compared with the kinematic number of rotations, so that the roller is found in a condition that is below the kinematic and which causes a slippage. During this condition, a smeary film is built-up on the contact surfaces between the rollers and the inner race so that it can be said that a multi-segmented gliding bearing and liquid friction is produced.

This quite favorable running and operating condition is periodically interrupted and the smeary film is destroyed. For example, when the shaft speed or load is changed, a metallic contact between the inner race and the rollers occurs. Consequently, within a short time period, the rollers are speeded up to the kinematic number of revolutions and, following that, are retarded because of friction which, in turn, is associated with a strong wear and tear appearance which, again in turn, leads to a premature disintegration of the bearing.

Attempts have been made with conventional radial roller bearing to overcome this slippage by axial bracing means which, in general, cannot be accomplished to the point where the rollers can roll free from play in order not to cause any wear and tear.

However, when cylindrical roller bearings are used, especially in gas turbines, because of the favorable roller kinematics and the axial movability in the high speed low load range, the possibility of reducing the slippage by means of axial bracing must be foregone. A known solution, such as providing an additional shaft load by means of a further bearing, does not lead to the desired success since it requires an increased construction expense, but also leads to a decrease in the life expectancy of the bearing.

The objects of this invention are to produce a high speed roller bearing which avoids the above disadvantages and which is comparatively inexpensive.

In general, these objects are obtained by the cylindrical roller surfaces as they are composed partially of a material characterized by high wear and tear resistance, high bending strength and, in comparison to a steel roller bearing, by a low E-modulus, whereby the roller bearing parts are radially braced in the bearing.

The aforesaid disadvantages are avoided in this invention in that the rollers are composed of a material of low elasticity and high wear and tear resistance, for example a synthetic material, and thus rolls within the entire speed range on the surface of the driven inner race and the stationary outer race of the bearing, even when great centrifugal forces affect the supporting cylindrical steel rollers at the highest speeds.

Another feature of this invention is in that one or more rings are mounted on the inner race which rings are highly wear and tear resistant and have a low elasticity. These rings are positioned with respect to strength and shape in such a way that they are self-sufficient and which have a larger outer diameter than the inner race. It is preferred, for best results, that the rings are mounted in two shoulders of the inner race so that the rings extend to the level of the abutting surface between the inner ring and the rollers. While the actual bearing races and the steel rollers have a positive radial play, there also exists a negative radial play, which means a radial bracing between the rings and the inner race and the rollers.

It is clear from the above that a drive for the rollers is guaranteed even at the highest speeds, because of the constant contact between the rings which have a low elasticity with the larger rollers. If a radial stress should occur, then the driving rings, which however are not supporting rings because of the low E-modulus, are elasticically deformed to such an extent that the large diameter rollers come into contact with the inner race made of roller bearing steel, which then takes on the load.

A further development of this invention is in that the conventional radial or cylindrical roller bearing, as contrasted to the above, is provided with a few cylindrical rollers which are uniformly distributed around the circumference of the bearing and which are composed of a material having the above required characteristics. The roller bearing, which is free from slippage at high speeds, is characterized by at least three cylindrical rollers of high wear and tear resistance and low elasticity and are uniformly positioned around the path of the rollers and whose diameter is larger than the diameter of the actual steel rollers. These larger diameter rollers are installed with a negative radial play, while the smaller diameter steel rollers have the conventional radial play. The rollers which have a low elasticity run, because of their radial bracing during turbine operation as a drive element for the bearing cage which turns in the same direction and way as the shaft.

This invention is characterized by its simple structure and a small space requirement, just as conventional roller bearings. Also, this invention has the advantage that most conventional roller bearing types can be partially used. Because it operates free from slippage at high speed, the wear and tear on the bearing surfaces and rollers is minimized so that the customarily calculated life expectance is obtained.

In addition to the above advantages and namely the freedom from slippage, this roller bearing has an excellent vibration absorption in the roller bearing system.

Even though the supporting strength of the bearing of this invention is somewhat reduced, this disadvantage can be readily accepted for the radial load which, in practice, arises in the operation of a gas turbine.

Thermo expansion of the inner and outer races of the bearing occurring by different temperatures or manners of installation, do not have a damaging effect on the races and rollers because of the low modulus of elasticity.

Figure 2:
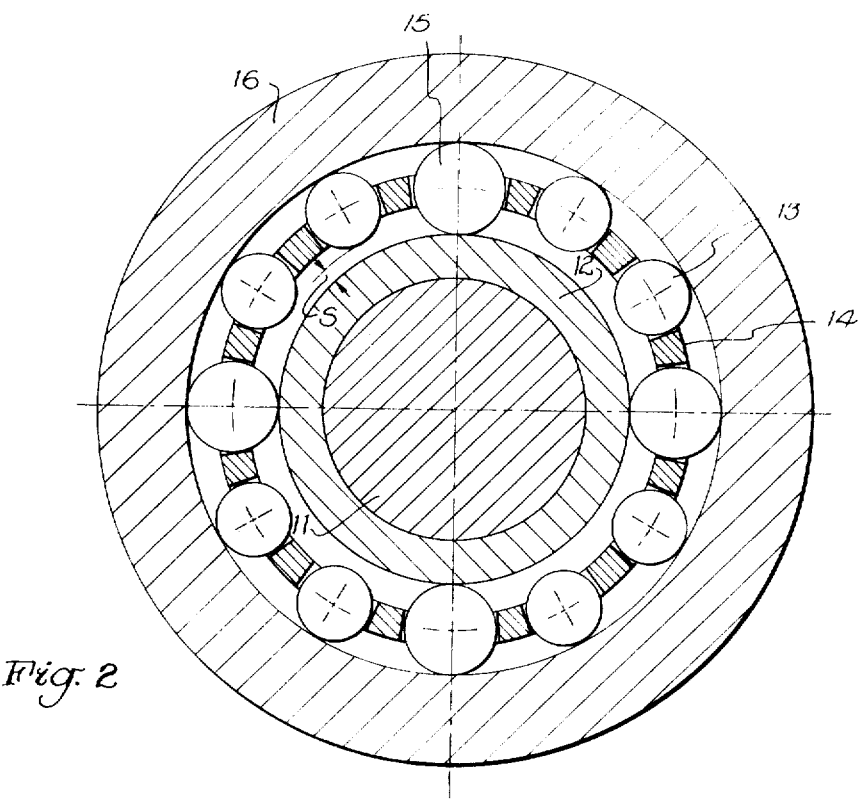

The means by which the objects of this invention are obtained are described more fully with reference to the accompanying drawings in which FIG. 1 is a longitudinal cross-sectional view of a bearing mounted on a shaft, and FIG. 2 is a transverse cross-sectional view through the bearing with the lower diameter rollers shown positioned at high speed rotation.

As shown in FIG. 1, the torque is transferred from shaft 1 onto inner race 2 of the roller bearing which has on each side shoulders in which are mounted rings 3 and held in place in axial direction by rings 6. Each ring 3 is self-sufficient with regard to strength and shape. The roller 4 riding between inner race 2 and outer race 7 is contained in cage 5 to maintain the roller parallel to the bearing axis and rides on the surface of rings 3 in such a way that the roller is braced radially and the drive of the roller 4 is guaranteed in operation because of the constant contact between the roller and rings 3. The driving rings 3 provide a negative radial play with the rollers 4. In contrast thereto it is shown that the roller 4 has a positive radial play with regard to the bearing supporting surface of inner race 2.

It is clear from FIG. 2 that in a conventional roller bearing, every third steel cylindrical roller 13 is replaced by a roller 15 of larger diameter and composed of a material which is more resistant to wear and tear and having a low elasticity. This roller 15, because of being radially braced with the inner race 12 is in constant contact both with the inner race 12 and the outer race 16, so that the supporting cylindrical rollers 13 positioned in cage 14 rotate at the same speed as the high speed shaft 11. The positive radial play S between the steel cylindrical rollers 13 and the inner race 12 have been shown in exaggerated scale.

The resin-material for roller 15, which have the characteristics of a high wear and tear strength and in comparison with conventional roller-bearing-steel low elasticity, preferably is an elastomer, specially a polyurethane elastomer or an urethane elastomer. For instance, there is available the du Pont de Nemours product "Adiprene L-167" (urethane elastomer) or the blends of Adiprene L-167. (Adriprene is a registered trademark).

For example, the physical properties of an urethane elastomer are as follows:

| | |
|---|---|
| 100% Modulus, psi (kg/sq cm) | 800–2100 (56–148) |
| 300% Modulus, psi (kg/sq cm) | 2200–4400 (155–309) |
| Tensile Strength, psi (kg/sq cm) | 5100–5800 (359–408) |
| Elongation at break, % | 420–360 |
| Hardness, durometer A | 85–95 |
| Tear strength, ASTM D-470 lb/in (kg/cm) | 100–160(17,8–28,5) |
| NBS abrasion index | 300–450 |

Having now described the means by which the objects of this invention are obtained, We claim:

1. A roller bearing for preventing slippage between the rollers and races of a high speed shaft as in a gas turbine comprising an inner race, an outer race, and rollers between the races, said races and rollers having rolling surfaces composed of a material having high wear and tear resistance, high bending moment strength and a low modulus of elasticity, as compared to roller bearing steel for radially bracing the races and rollers in the bearing, and at least one ring (3) highly resistant to wear and tear mounted on said inner race (2) for contact with the rollers in such a manner that it is self-sufficient as to strength and shape and having a larger outer diameter than said inner race.

2. A bearing as in claim 1, said ring (3) being mounted in a shoulder in said inner race and extending to the level of the abutting surface between said ring and rollers.

3. A bearing as in claim 1, said rollers being steel rollers, and at least three other rollers (15) of larger diameter than said steel rollers uniformly distributed between said steel rollers, said other rollers (15) having a high wear and tear resistance and a low modulus of elasticity.

* * * * *